Oct. 8, 1946.  E. J. DILLMAN  2,409,112
AUTOMATIC VALVE
Filed June 3, 1942  3 Sheets-Sheet 1

INVENTOR
Earnest J. Dillman
BY
Andrew K. Fonda
his ATTORNEY

Oct. 8, 1946.          E. J. DILLMAN          2,409,112
AUTOMATIC VALVE
Filed June 3, 1942          3 Sheets-Sheet 2

INVENTOR
Earnest J. Dillman
BY
Andrew K. Foulds
his ATTORNEY

Oct. 8, 1946.  E. J. DILLMAN  2,409,112
AUTOMATIC VALVE
Filed June 3, 1942  3 Sheets-Sheet 3

INVENTOR
Earnest J. Dillman
BY Andrew K. Foulds
his ATTORNEY

Patented Oct. 8, 1946

2,409,112

UNITED STATES PATENT OFFICE 2,409,112

AUTOMATIC VALVE

Earnest J. Dillman, Detroit, Mich., assignor to Detroit Lubricator Company, Detroit, Mich., a corporation of Michigan Application June 3, 1942, Serial No. 445,571

27 Claims. (Cl. 137—139)

This invention relates to new and useful improvements in an automatically actuated valve for controlling flow of fluid and, more particularly, to a valve having a thermostatic operating means.

One object of the invention is to provide a valve which has a quick initial opening movement and which has a quick closing movement from a point adjacent its closed position.

Another object is to provide a valve having a stepped movement.

Another object is to provide means to determine the extent of initial quick opening of the valve.

Another object is to provide a novel electrically energized heat motor for operating the valve.

Another object is to provide means to compensate for variation in ambient temperature to which the heat motor is subjected.

Another object is to provide means to compensate for variation in heat input to the heat motor.

Another object is to provide means to discharge heat from the heat motor.

The invention consists in the improved construction and combination of parts to be more fully described hereinafter and the novelty of which will be particularly pointed out and distinctly claimed.

In the accompanying drawings, to be taken as a part of this specification, there is fully and clearly illustrated a preferred embodiment of said invention, in which drawings.

Figure 1:
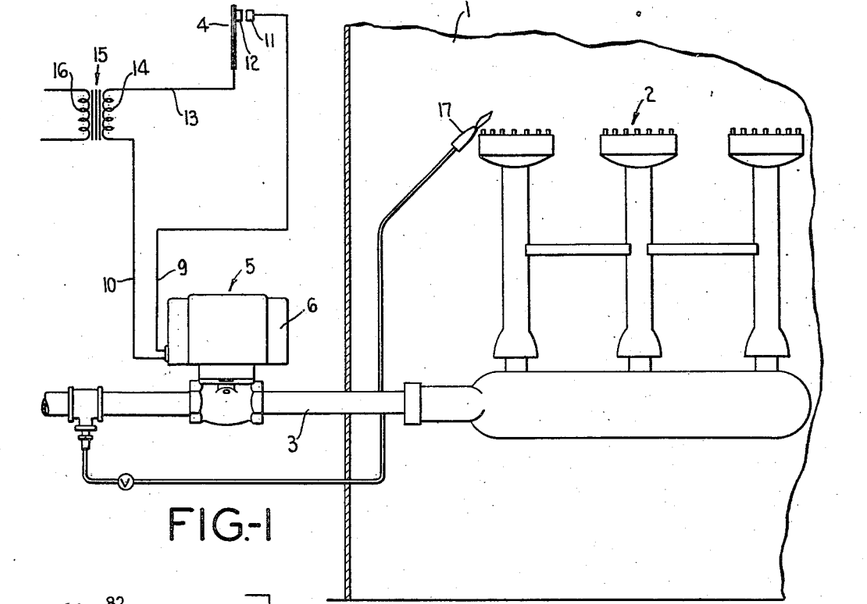
Figure 1 is a diagrammatic view of a heating apparatus showing the valve of the invention operatively positioned therein.
Figure 2:
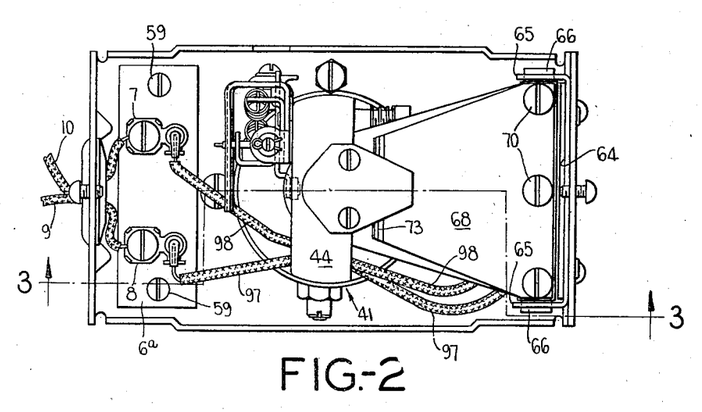
Fig. 2 is a top plan view of the valve but having its cover member removed to show internal construction.

Referring to the drawings by characters of reference, 1 designates generally a furnace, boiler or the like having a gaseous fuel burner 2 supplied by a gas line or pipe 3 and operable to supply heat to a room or space having a temperature responsive control switch 4, such as a room thermostat. In the pipe 3 and controlling the flow of gas therethrough there is the electrically operated valve 5 of this invention. Within the valve housing 6, see Fig. 2, there is a terminal block 6ª of electric insulating material having terminals or binding posts 7, 8 from which extend lead wires 9, 10 respectively. The fixed contact 11 of the thermostat 4 is connected to the lead wire 9 and from temperature actuated contact 12 of the thermostat 4 a lead wire 13 connects to the secondary coil 14 of a step-down transformer 15 which has its primary coil 16 connected to a suitable source of current supply. Lead wire 10 connects to the other side of the secondary coil 14. The usual pilot burner 17 is provided for igniting the main burner 2 and is connected to the pipe 3 on the inlet side of the valve 5.

The valve 5 has a body 18 with a flow passageway therethrough having an inlet 19 and an outlet 20 communicating through a valve port 21 provided with an annular seat 22 and opening through a partition 23. The upper open side of the valve body 18 is closed by a bonnet 24 having an aperture 25 therethrough concentric with the port 21. Clamped at its periphery between the body 18 and the bonnet 24, there is a flexible diaphragm member 26 which seals communication between the interior of the body 18 and the interior of the bonnet 24. A valve stem 27 extends through a central aperture in the diaphragm 26 and has a cupped metal reinforcing washer 28 secured thereto and against which the diaphragm is clamped by a cupped washer 29 urged to clamping position by a sleeve nut 30 screw-threaded on to the stem 27. The nut 30 has a surrounding flange 31 on which is seated a valve member supporting helical spring 32.

Figures 3, 11, 12:
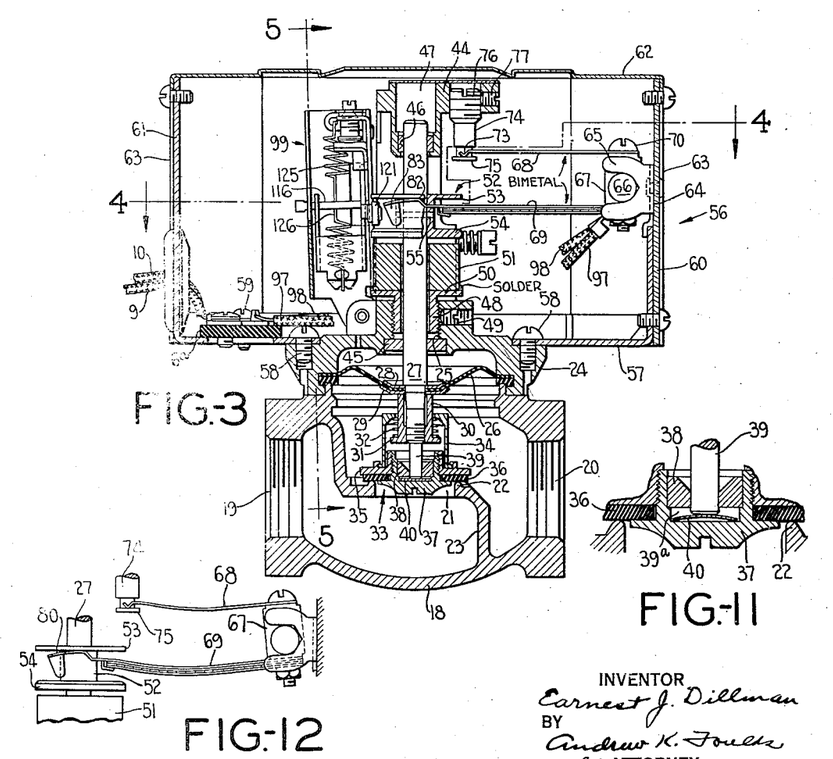
Fig. 3 is a view of the valve in section on the line 3—3 of Fig. 2.
Fig. 11 is an enlarged detail view in section of the valve member showing the position of certain of the parts as the valve member leaves its seat or makes initial contact therewith.
Fig. 12 is a detail view showing the operation of the heat motor compensating means.

The valve member 33 has a cylindrical cap 34 which surrounds the nut 30 and has a downward facing internal shoulder which seats on the upper end of the spring 32. The cap 34 supports a valve washer backing member 35, against which the valve washer or disc 36 is clamped by a hollow screw 37. Within the screw 37 there is an annular valve stem guide 38 in which the lower reduced stem end portion 39 is reciprocally guided. The guide 38, see Fig. 11, seats on a shoulder within the screw 37 to provide an internal chamber 39a in which there is positioned a resilient spring disc 40 which tends to freeze into upwardly concave position as in Fig. 11. Upon seating of the valve member 33 upon its seat 22, force applied to the stem 27 will move the lower stem end portion 39 through the guide 38 and compress or flatten out the spring 40, as in Fig. 3, so that the valve member 33 is positively held against its seat.

The bonnet 24 has an upward extending supporting member 41 with laterally spaced parallel supporting pillars or posts 42, 43 which are joined at their upper ends by a cross frame member 44. The stem 27 extends upward and out of the valve casing bonnet 24 through a guide member 45 secured in the bonnet aperture 25. The stem is positioned a substantially equal distance between the pillars 42, 43 and at its upper end extends through a guide ring 46 secured in a vertical opening 47 through the cross member 44. Supported on the bonnet 24 and surrounding the valve stem 27 there is a supporting sleeve 48, preferably screw threaded, into the bonnet aperture 25 and locked in position by a set screw 49. On the upper end of the sleeve 48 there is a horizontal annular magnet 51 which surrounds the stem 27 and is secured to the flange 50 by solder, the sleeve 48 being adjustable to regulate the position of the magnet. Cooperable with the magnet 51 there is an armature 52, preferably in the form of a collar having upper and lower flanges or abutments 53, 54 respectively and which is secured to the stem 27 by a cross pin 55. The armature 54 is held from engagement with the magnet 51 by the engagement of the valve member 33 with its seat 22 so that an air gap is maintained.

Figures 8, 9, 10:
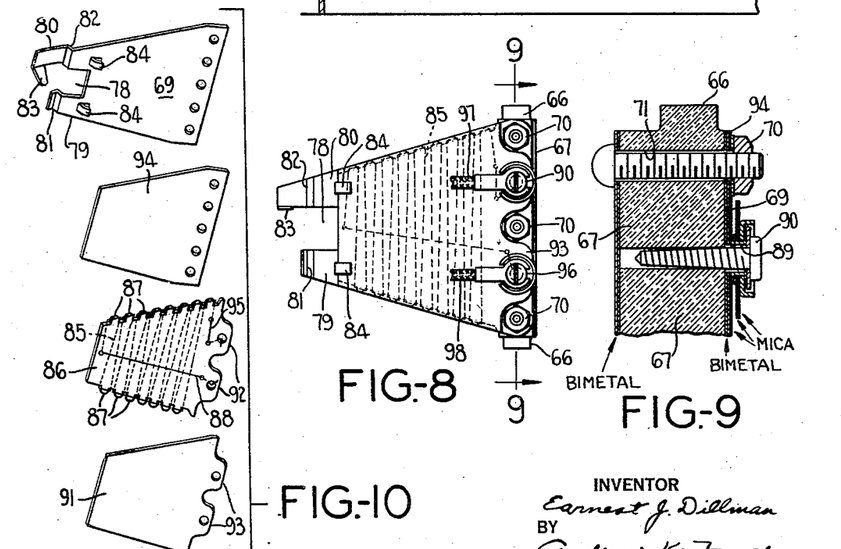
Fig. 8 is a bottom plan view of the heat motor for actuating the valve.
Fig. 9 is a detail view in section on the line 9—9 of Fig. 8.
Fig. 10 is a detail exploded view in perspective of the elements which comprise the heat motor.

Supported on the bonnet 24 there is a housing 56 having a bottom wall 57 with a central opening through which the supporting member 41 extends, the wall 57 being secured by screws 58 to the bonnet. The terminal block 6a is secured to the bottom wall 57 by screws 59. The housing 56 has upwardly extending end or side walls 60, 61 and a cover member 62 of substantially U-shaped cross section so that it provides a top wall and side walls which are flanged, as at 63, to embrace the end walls and tightly close the housing. Secured to the end wall 60 there is a bracket or supporting member 64 having horizontally spaced bearing arms 65 positioned in vertical planes and having open-end recesses or bearing apertures to receive the end trunnions 66 of a supporting bar 67 of heat insulating material. The upper and lower surfaces of the bar 67 are flat substantially parallel faces extending generally in horizontal planes, though movable therefrom upon rocking of the bar 67. Secured to the bar 67 there is a temperature responsive compensating element 68 which is a substantially flat bimetal plate of truncated triangular form having a side face adjacent its longer base lying flat against the top face of the bar 67. Also secured to the bar 67 there is a temperature responsive operating element 69 which is a substantially flat bimetal plate of truncated triangular form having a side face adjacent its longer base lying flat against the under face of the bar 67. The bimetal plates 68 and 69 are clamped and tightly held in position on the bar 67 by bolts and nuts 70 which extend through transverse apertures 71 through the bar 67, see Fig. 9. The plate 68 at its smaller base or free end has, midway up its side edges, a rectangular notch or recess 72. The end edge of the plate 68 at the sides of the notch 72 has a downward offset bearing portion 73 formed by a bend of V-shaped cross section. Extending through the notch 72 there is an adjustable supporting post 74 having a circumferential recess to provide an end flange or head 75 on which the portions 73 seat or rest. The upper end portion 76 of the post 74 is adjustably screw-threaded in a vertical aperture through the cross member 44, a set screw 77 being provided to lock the post 74 in adjusted position. The free end portion of the plate 69 has midway of its side edges a rectangular recess 78 which receives the valve stem 27 and which provides parallel arms 79, 80 which lie between the collar flanges 53, 54. The arms 79, 80 have offset upward extending bearing portions 81, 82 respectively of substantially inverted V-shape in cross section and engaging at opposite points the under side of the flange 53. The arm 80 has a transverse end flange or finger 83 which extends generally parallel to the stem 27 for abutting engagement with the top face of flange 54. The finger 83 is of such a length that when the bearing portion or abutment 82 is in engagement with the flange 53, the finger 83 will be slightly away from contact with the flange 54 so that warping or bending of the plate 69 will not cause binding of the arm 80 between the flanges 53, 54. Bent or formed from the plate 69 there are spaced clips or clamping lugs 84 which are substantially midway of the arms 79, 80 and substantially on the line of the base of the recess 78, extending therefrom toward the bar 67 in underlying relation to the plate 69. Clamped to the under face of the plate 69 by the clips 84 there is an electric resistance heating coil 85 which is wound in zigzag form on the upper face of an insulating material sheet 86, preferably of mica. The sheet 86 is generally of truncated triangular form to conform to the plate 69 and has longitudinally spaced side edge tabs or ears 87 around which the turns of the wire coil 85 are bent so that the coil is secured and held in position. The lead wire portion 88 extending from the smaller end of the coil 85 is threaded through apertures in the sheet 86 so that it is insulated from the turns of the coil by the sheet, the end of portion 88 being electrically secured to a terminal eyelet 89 of a binding post screw 90. The eyelet 89 clamps the sheet 86 to an insulating sheet 91 which overlies the wire portion 88, the sheets 86 and 91 having end tabs 92, 93 respectively through one overlying pair of which the hollow or eyelet rivet 89 is secured. Interposed between the coil 85 and the plate 69 there is a sheet of insulating material 94 which is apertured for passage of the screw 90 therethrough but which has its marginal portion surrounding aperture interposed between the rivet 89 and the plate 69, the aperture through the plate 69 being sufficiently large so that the screw 90 does not have contact therewith, see Fig. 9. The other terminal end portion 95 is threaded through locking apertures in the sheet 86 and is electrically connected to and clamped by a hollow rivet or eyelet (not shown) which secures together another of the pairs of ears 92, 93 in similar fashion to that of rivet 89. Cooperable with this second rivet there is a terminal screw 96 which is also insulated from the plate 69, the screws 90 and 96 being threaded into the bar 67. The purpose of the tabs 92, 93 is to permit the rivet heads to lie between the sheets 86 and 94, that is, so that the sheets 86 and 91 will not be engaged by the clamping nuts and bolts 70 which might break or injure the insulating sheets 86 and 91. Connected to the terminal screws 90, 96 there are lead wires 97, 98 respectively which extend to the terminal block 6ª and have their ends connected respectively to the terminals 7, 8.

The step control or means for limiting the extent of initial valve opening movement is carried by a supporting bracket member 99 secured to the post or pillar 42. The bracket member 99 is in the form of an upright channel having side flanges 100, 101 joined at their rear substantially vertical edges by a rear or base wall 102. The flange or side wall 100 has intermediate its ends a horizontal boss or raised portion 103, see Fig. 6, which, together with the lower edge portion 104 of the flange, provide bearing surfaces for abutting engagement with the side face or edge 105 of the post 42 so that the plane of the flange 100 is at a slight angle to the face of the post 42. Perpendicularly through the flange 100 there is an internally screw-threaded aperture 106 into which is screw-threaded a supporting rod or post 107 which extends through a bore or aperture 108 in the post 44, the bore 108 being at right angles to the post face 105. Therefore, when the bearing surfaces 103, 104 are drawn up against the face 105, the post 107 will be radially tensioned against upper and lower points or areas at the opposite ends of the bore 108 so that the bracket member 99 will be rigidly held in position and particularly against any downward shifting movement which would alter the set position of the mechanism supported thereby. The bracket member 99 is held against the post 44 by a stiff helical coil spring 109 under compression between the post 44 and the head 110 of the rod 107. A screw adjustment is provided for seating and permanently holding the bracket 99 in an adjusted rotary position relative to the post 44 and which provides for a setting in manufacture of the relation of the mechanism carried by the bracket member 99. This adjustment is provided by a screw 111 extending through a slot aperture 112 in an ear 113 projecting downward from the bottom end of the wall 102, the screw being threaded into a lug 114 rigid with the valve bonnet 24. A compression spring 115 interposed between the ear 113 and the lug 114 serves to hold the ear 113 against the head of the screw 111 during adjustment, the screw head and ear preferably being locked together by solder after adjustment. Bridging the space between and extending through the flanges 100, 101 substantially midway the height of the bracket member and adjacent its front edge, there is a bearing shaft or pivot pin 116 on which is journaled a lever stop member 117 having oppositely directed substantially horizontal arms 118, 119 and a downward directed arm 120. The arm 119 extends between the collar flanges 53, 54 and is provided with a friction eliminating roller 121 cooperable with the top face of the flange 54. The top face of the arm 118 is curved to provide a cam abutment surface 122 cooperable with an adjustable stop member 123 which projects transversely from an adjustment lever 124 journaled on the bracket flange 100. The arm cam surface 122 is urged toward the stop member 123 and normally held thereagainst by a coil spring 125 having one end anchored to the lever arm 120 and having its other end anchored to a lug on the adjustment lever 124. The stop member 123 is held in adjusted position against the force of spring 125 by an adjustment screw 126 carried by a horizontal end projecting from the bracket flange 100. The screw 126 also serves to adjust the position of the stop member 123 along the cam surface 122 and thereby positions the roller 121 relative to the collar flange 54 when the valve member is in closed position. The lever arm 118 extends through a slot 127 in the rear bracket wall so that, if desired, the valve member may be manually moved to open position by finger pressure on the projecting end of the lever arm 118, that is, downward movement of lever arm 118 will move the roller 121 into lifting engagement with the under face of the collar flange 53. The spring 125 has a straight mid portion 128 so that on upward or counterclockwise movement of the arm 119, the spring 125 can move at its lower end to bring the spring substantially into dead center position in which it will exert substantially no force tending to move the lever 117. The spring 125 acts at a very acute angle upon the lever 117 so that it has only a slight increase of tension on upward movement of the lever arm 119 and has, due to the decrease in the angle of application of its component of force, a decreasing resistance upon initial upward movement of the lever arm 119.

Supported by the post 43 there is a manual means 129 for holding the valve in open position in the event of current failure for example. This means is provided by a spring retracted thrust member 130 reciprocally supported in a chambered bolt 131 clamped through an aperture in the post 43. Upon upward movement of the thrust member 130 against the force of the retracting spring 132, see Fig. 7, the inner end or head of the thrust member can be positioned beneath the plate extension or arm 80 when the valve member has been manually lifted so that the thrust member can be moved into position between the flanges 53, 54. In this position of the valve member, it is not fully opened and therefore upon resumption of the current supply the thermostatic heat motor will be operable to lift the weight of the valve member from the thrust rod 130 so that the spring 132 can return the thrust member to inactive position as in Fig. 5.

The operation, assuming the valve to be installed in a heating system as in Fig. 1 for example, is as follows: The adjustment screw 74 has been set in position to determine the time of the heat motor. Rotation of the screw 74 to move its supporting flange 75 downward will increase the time period required to move the valve to open position and provide a corresponding shorter time to close, whereas lifting of the flange 75 by screw rotation will decrease the opening time period and provide a correspondingly longer closing time. The stop adjustment screw 126 will also be adjusted to determine the extent of the fixed step of valve opening movement and therefore the minimum flow setting of gas supply to the burner 2. When the room thermostat 4 calls for heat and closes contacts 11 and 12, the heat motor resistance coil 85 will be energized and impart heat to the thermostat plate 69. Because of the shorter length and area of the compensating plate 68 relative to the length and area of the valve operating plate 69, the screws 70 are employed to provide some heat leakage by conduction from the coil 85 and plate 69 to the plate 68 in order to compensate for this difference in plate sizes. When the force exerted by the heat motor against the flange 53 of the armature member 52 is sufficient to overcome the attractive force of the magnet 51 then the valve stem 27 will be moved upward quickly until the flange 54 on the armature member engages the step determining roller 121. This movement will position the valve member in minimum desired open position, supplying sufficient gas to the burner 2 to assure a flame which will not flash back. This initial step of opening movement will occur with a quick substantially snap action due to the decrease in flux-density as the armature flange 54 is moved away from the magnet 51. The resistance to further open movement of the valve which is exerted by the component of force of spring 125 will now provide a hesitation period or time lag of say 8 to 10 seconds during which the minimum supply of gas will be furnished to the burners 2 in order to properly warm up the burner structure preparatory to full supply of gas. When the energy stored in the plate 69 by the heat imparted thereto from the coil 85 becomes sufficient to overcome the component force of spring 125 and initiate the second step of upward valve opening movement, the valve will be moved quickly with a substantially snap action through the remainder of its range of opening movement and to full open position determined by engagement of the diaphragm supporting disc 28 with the top wall of the bonnet 24. In this position of the parts, corresponding to full open position of the valve, the spring 125 will be exerting substantially a zero component of force against the valve stem 27 so that the valve member will be held in open position substantially solely by the upward force of the heat motor. It may be noted that the decrease in resistance exerted by the spring 125 partially compensates for the decreasing in force of the heat motor as it moves the valve to its full open position. Since the heat motor is enclosed in a substantially air tight housing, the ambient temperature within the housing will be increased by the heater coil 85 during the period that the valve is held in open position by the heat motor and therefore the cooling time of the heat motor and plate 69 will increase in accordance with the length of time that the heat motor is maintained energized. In order to compensate for this ambient temperature change which would render the valve closing time or period irregular, the bimetal compensating plate 68 is provided. As the ambient temperature increases, the plate 68 will warp in a downward bowed direction as in Fig. 12, thereby rocking the supporting bar 67 counterclockwise facing Figs. 12 and 3 so that the tension of the operating plate 69 against the flange 53 will remain substantially constant. This compensating plate 68 will also compensate for variation in heat input to the operating plate 69 which will result from voltage variation. This voltage compensation will result both from heat imparted to the plate 68 by radiation and convection and also by conduction through the clamping screws 70. When the room thermostat 4 is satisfied and opens the circuit to the heating coil 85 the valve will tend to move to closed position by its weight as the holding force of the operating plate 69 decreases. Should the valve stem 27 not move downward by gravity as the plate 69 tends to straighten out, then the finger 83 will engage the lower collar flange 54 and positively move the valve member toward closed position. When the valve member has had initial downward movement on cooling of the plate 69, the increasing component of force of the spring 125, due to change in the position of lever 117 by its engagement with flange 53, will move the roller 121 into engagement with the flange 54 so that increasing component of force will act to move the valve member toward closed position when the armature flange 54 reaches a position such that the armature 52 is in the effective field of the magnet 51, then the attractive force of the magnet will pull the valve stem 27 quickly downward and shut off the gas flow with a snap action. Should the ambient temperature surrounding the valve 5 during a standby period of the burner 2 be relatively cold so that the bimetal plate 69 would warp to a downward concave position, thereby tending to hold the valve member closed and which would result in an excessive time period for valve opening movement after energization of the heat coil 85, then the bimetal compensating plate 68 will correct for this ambient temperature change. Since the plate 68 is subjected with the plate 69 to the low ambient temperature, the plate 68 will likewise bend into a downward concave position and rock the supporting bar 67 in a clockwise direction facing Figs. 3 and 12, thereby automatically adjusting the position of the plate operating arm 89 with respect to the closed valve member. The valve will therefore be opened at a lower temperature of the plate 69 but without any substantial change in the elapsed time period following energization of the coil 85.

Figures 4, 5, 6, 7, 13, 14:
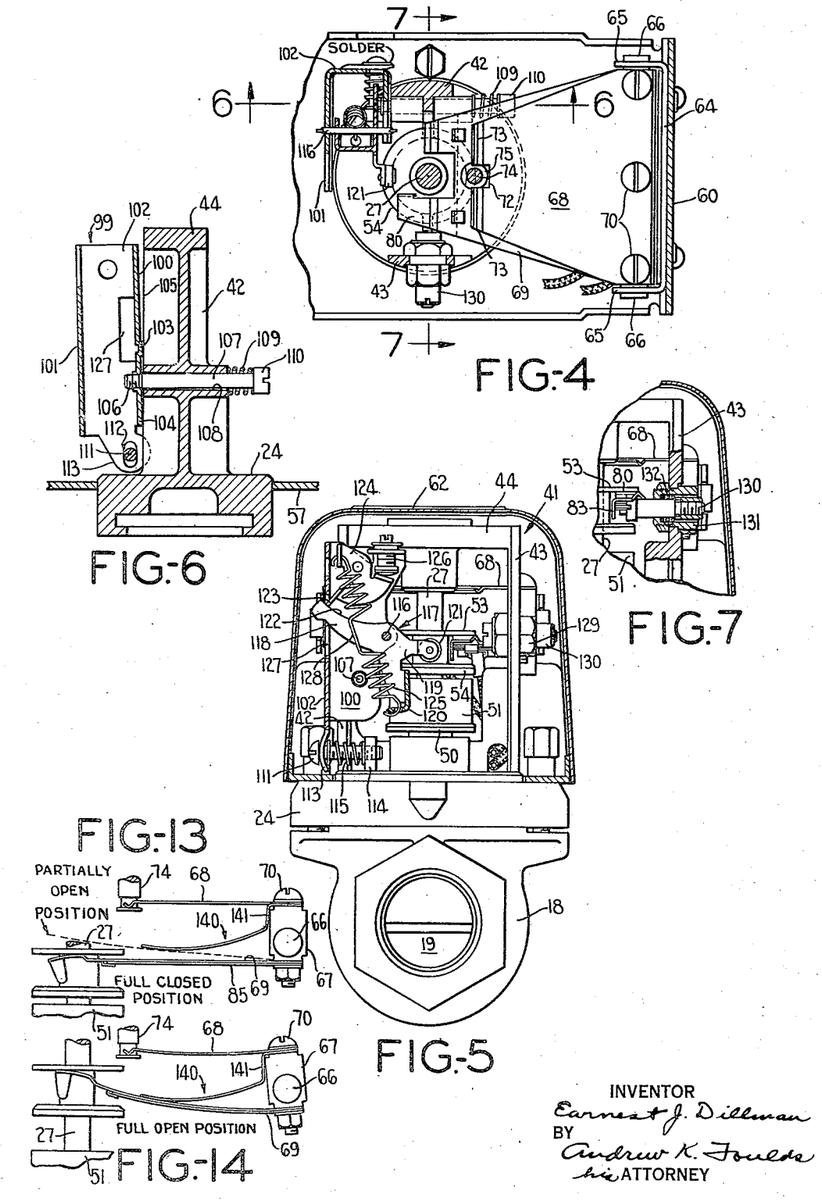
Fig. 4 is a view in horizontal section on the line 4—4 of Fig. 3.
Fig. 5 is a view in section on the line 5—5 of Fig. 3 but showing the valve body in end elevation.
Fig. 6 is a detail view in section on the line 6—6 of Fig. 4.
Fig. 7 is a detail view in section on the line 7—7 of Fig. 4.
Fig. 13 is a detail view showing a heat abstracting means applied to the heat motor.
Fig. 14 is a detail view showing the full travel position of the heat motor and the cooperation of the abstracting means therewith.

Referring to Figs. 13 and 14 there is shown means for abstracting heat from the thermostatic valve actuator. Secured to the cross bar 67 and clamped thereto beneath or in underlying relation to the compensating plate 68 by the nuts and bolts 70 there is a resilient heat conducting plate 140 which is of generally truncated triangular form in plan view conforming to the outline of plate 68 and preferably of hard copper and of about 0.005 inch thickness. This plate 140 has a down-turned portion 141 which lies substantially against a face of the bar 67 and extends toward the heat motor element 69. From about midway between the plates 68 and 69 the plate 140 extends toward the valve stem 27 and is of longitudinal form being convexed downward. The plate 140 is in spaced relation to the plate 69 when the valve is in full closed position and terminates at its free end adjacent the armature member 52. When the heat motor coil 85 is energized, the operating plate 69 will warp upward, lifting the valve member and its stem 27 as above described. When the valve member has been moved through the major part of its opening travel, the operating plate 69 will be positioned sufficiently in the dotted line position, Fig. 13, designated "partially opened position," in which position the plate 69 will initially contact the conducting plate 140. The resistance offered by the resilience of the plate 140 to continued opening movement of the valve is not sufficient to interrupt its continuous opening movement by the heat motor so that the valve will have its full opening movement as heretofore described. With the valve in full open position the conducting plate 140 will be in good heat conducting relation with the operating plate 69 and will carry away therefrom the heat imparted thereto from the resistance coil 85. Some of this conducted heat will be transmitted to the compensating plate 68 and some will be radiated to the air in the heat motor housing. This additional heat radiated and conducted to the plate 68 will increase its downward convexing bowing with less time lag than occurs with the construction of Fig. 12 and also serves to warp the plate 68 in substantially complete compensation for the warping and tension of the operating plate 69 so that upon deenergization of the heating coil 85 there will be a very quick response by the operating blade or plate 69 with resulting movement of the valve member and its stem 27 toward closed position. It may be also noted that the conducting plate 140 aids in the rate of cooling of the operating plate 69 because it continues to abstract heat from the plate 69 as the free end of the plate moves downward.

Having thus described the invention, what is claimed and is desired to be secured by Letters Patent of the United States is:

1. An automatically operable valve, comprising a valve casing, a valve member in said casing and having a stem extending out of said casing, an abutment member of magnetic material surrounding and secured on said stem external of said casing, a bimetal heat motor engaging said abutment and operable to move said valve member toward open position, a magnet surrounding said stem and cooperable with said abutment member to resist initial opening movement of said valve member by said heat motor, a pivoted arm extending into the path of movement of said abutment member and spaced from said abutment member in valve member closed position, and means acting on said arm to oppose yieldingly the opening movement of said valve member, said heat motor acting upon temperature increase to overcome said acting means.

2. An automatically operable valve, comprising a valve casing, a valve member in said casing and having a stem extending out of said casing, said stem having an abutment external of said casing, thermostatic means operable to move said valve member toward open position, means resisting initial opening movement of said valve member by said thermostatic means, a pivoted arm extending into the path of movement of said abutment and spaced from said abutment in valve member closed position, said arm having a cam portion, an adjustable stop member pivotally supported by said casing and movable along said cam portion, means to pivot said stop member to determine the spacing of said arm from said abutment in valve member closed position, and means acting on said arm to oppose opening movement of said valve member, said thermostatic means acting upon temperature increase to overcome said acting means.

3. An automatically operable valve, comprising a valve casing, a valve member in said casing and having a stem extending out of said casing, said stem having an abutment external of said casing, thermostatic means operable to move said valve member toward open position, cooperable magnet and armature members resisting initial opening movement of said valve member by said thermostatic means, a pivoted arm extending into the path of movement of said abutment and spaced from said abutment in valve member closed position, said arm having a cam portion, an adjustable stop member movable along said cam portion to determine the spacing of said arm from said abutment in valve member closed position, and a spring acting on said arm to oppose opening movement of said valve member, said spring having one end anchored to said arm and its other end anchored to said stop member and being supported thereby in a position to exert a decreasing component of force in opposition to opening movement of said valve member upon movement of said arm and to exert substantially no resistance to opening movement of said valve member in the full open position of said valve member, said thermostatic means acting upon temperature increase to overcome said spring.

4. An automatically operable valve, comprising a valve casing, a valve member in said casing and having a stem extending out of said casing, thermostatic means operable to move said valve member toward open position, said stem having an abutment, a supporting bracket pivotally mounted for adjustment on said casing, an arm pivoted on said supporting bracket and extending into the path of movement of said abutment, said arm having a range of adjustment to determine the spacing of said arm from said abutment in valve member closed position, a spring acting through said arm to oppose opening movement of said valve member, means to adjust pivotally the position of said supporting bracket to determine the position of said arm in valve member closed position, and means to hold said supporting bracket tightly in its pivotally adjusted position.

5. An automatically operable valve, comprising a valve casing, a valve member in said casing and having a stem extending out of said casing, thermostatic means operable to move said valve member toward open position, said stem having an abutment, a supporting bracket pivotally mounted for adjustment on said casing, an arm pivoted on said supporting bracket and extending into the path of movement of said abutment, said arm having a range of adjustment to determine the spacing of said arm from said abutment in valve member closed position, a spring acting through said arm to oppose opening movement of said valve member, and an adjustment screw interconnecting said supporting bracket and said casing and operable to adjust the position of said supporting bracket thereby to determine the position of the adjustment range of said arm relative to said abutment.

6. An automatically operable valve, comprising a valve casing, a valve member in said casing and having a stem extending out of said casing, thermostatic means operable to move said valve member toward open position, said stem having an abutment, a supporting bracket having an aperture, a shaft journaled on said casing and secured in said bracket aperture to support said bracket, a spring member acting longitudinally of and on said shaft to hold said bracket against rotation, an arm pivoted on said supporting bracket and extending into the path of movement of said abutment, a spring acting through said arm to oppose opening movement of said valve member, the centerline of the bearing for said shaft and the centerline of said bracket aperture being at an angle to each other so that play of said shaft in its bearing longitudinally of said stem is eliminated.

7. An automatically operable valve, comprising a valve casing, a valve member in said casing and having a stem extending out of said casing, a collar having upper and lower flanges and secured on said stem external of said casing, a flat bimetal plate having an end slot receiving said collar and providing end plate portions positioned between said flanges, said end portions being upwardly offset to engage the underside of said upper flange, one of said end portions having a downturned finger engageable with said lower flange, an electric heater coil insulated from and secured to said plate, said finger being normally spaced from said lower flange, and means supporting said plate for operation of said valve member.

8. An automatically operable valve, comprising a valve casing, a valve member in said casing and having a stem extending out of said casing, a collar having upper and lower flanges and secured on said stem external of said casing, a supporting bar positioned laterally of said collar and with its longitudinal axis transverse to said stem, means supporting said bar for rocking movement about its longitudinal axis, a bimetal plate secured to said bar and extending into operative relation to said collar to actuate said valve member, said plate having an upward offset end portion engageable with the underside of said upper flange to move said valve member toward open position, a downward extending finger projecting from said offset end portion between said flanges and engageable with the upper side of said lower flange to move said valve member positively toward closed position, an electric heating element secured to said plate, and a bimetal plate secured to said bar and operable to rock said bar to compensate for variation in ambient temperature affecting said first-named plate, said finger being spaced from said lower flange when said offset portion engages said upper flange.

9. An automatically operable valve, comprising a valve body, a bonnet closing an open side of said body and having an aperture therethrough alined with the valve port, a valve member controlling flow through said port and having a stem extending through said aperture, a hollow cylindrical permanent magnet supported on said bonnet and surrounding said stem, a collar of magnetic material surrounding and secured on said stem and spaced from said magnet when said valve member is in closed position, electrically heated thermostatic means engageable with said collar to actuate said valve member, means responsive to ambient temperature and operable to change the position of said thermostatic means to compensate for variation in ambient temperature, and means to conduct heat from said thermostatic means to said responsive means to compensate for variation in heat input to said thermostatic means.

10. An automatically operable valve, comprising a valve body, a bonnet closing an open side of said body and having an aperture therethrough alined with the valve port, a valve member controlling flow through said port and having a stem extending through said aperture, a hollow cylindrical permanent magnet supported on said bonnet and surrounding said stem, a collar of magnetic material surrounding and secured on said stem and spaced from said magnet when said valve member is in closed position, electrically heated thermostatic means engageable with said collar to actuate said valve member, and movable means to exert a predetermined resistance to opening movement of said valve member subsequent to initial opening movement of said valve member, said predetermined resistance being less than the force which can be exerted by said thermostatic means so that said thermostatic means is operable to overcome said movable means and continue opening movement of said valve member.

11. An automatically operable valve, comprising a valve body having a valve port, a bonnet closing an open side of said body and having an aperture therethrough alined with said port, a valve member cooperable with said port and having a stem extending through said aperture, a supporting member mounted on said bonnet and having spaced pillars positioned parallel to and on opposite sides of said stem and joined by a cross member, said bonnet and said cross member having guide means for said stem, a housing mounted on said bonnet and enclosing said supporting member, horizontally spaced bearing members extending into said housing member from a side wall thereof, a supporting bar having parallel upper and lower faces and having end trunnions supported in said bearing members, a flat bimetal plate secured to said lower face and extending toward said stem, a flat electric resistance heating coil positioned against said plate, lugs on said plate holding said coil in said position, a flat bimetal plate secured to said upper face, an adjustable supporting member for the free end of said second-named plate and projecting from said cross member, a collar of magnetic material secured on said stem between said pillars and having spaced flanges receiving therebetween the free end of said first-named plate, a tubular support rigid with said bonnet and surrounding said stem between said pillars, an annular flange on said support, a tubular permanent magnet seating on and secured to said annular flange and surrounding said stem in cooperative relation to said magnetic collar, heat conducting clamping means securing said first-named and said second-named plates to said supporting bar and transmitting heat from one to the other of said plates, said first-named plate having between said collar flanges a down-turned finger portion engageable with the lower flange to move said valve member toward closed position, a supporting bracket adjustably and frictionally held to one of said pillars, an arm pivotally supported intermediate its ends to said bracket and having an abutment roller positioned between said collar flanges and spaced from said lower flange in the closed position of said valve member, said arm having a cam portion, an adjustable pivoted stop member carried by said bracket and having a stop finger engaged by said cam portion to limit movement of said arm toward said lower flange, and a coil spring having one end secured to said arm and having its other end secured to said stop member thereby to resist movement of said valve member by said first-named bimetal plate, said spring being positioned to act at an acute angle on said arm so that the component of force of said spring opposing movement of said arm decreases upon opening movement of said valve member.

12. A compensated electric heat motor comprising a supporting bar of heat insulating material and having parallel faces, a plate of bimetal seated at one edge portion on one of said faces, a second plate of bimetal seated at one edge portion on the other of said faces and extending in parallel overlying relation to said first-named plate, a plurality of sheets of insulating material, an electric resistance heating coil of wire wound on an intermediate one of said sheets, said intermediate sheet having edge tabs receiving the turns of said coil such that substantially all of said coil lies on one face of said intermediate sheet, means securing said sheets to one of said plates, and a metal member having a low heat conductivity extending through said plates and said bar and securing said plates to said bar and directly connecting said plates together to transmit heat from one to the other of said plates.

13. An automatically operable valve, comprising a valve body, a valve member in said body and having a stem, a permanent magnet surrounding said stem, a collar of magnetic material secured on said stem and cooperable with said magnet to bias said valve member to closed position, a bimetal heat motor having an arm cooperable with said collar to actuate said valve toward open position against the force of said magnet, a normally ineffective thrust member having an end portion laterally movable into underlying engagement with said motor arm upon lifting of said arm above said thrust member thereby to hold said valve member in an open position, and means operable upon energization of said heat motor to retract said thrust member from holding position so that said valve member can move toward closed position.

14. An automatically operable valve, comprising a valve casing, a valve member in said casing, resilient thermostatic means operable on movement when heated to move said valve member, controlled heating means for supplying heat to said thermostatic means, cooperable magnet and armature members acting to hold said valve member against the force of said thermostatic means thereby to tension said thermostatic means so that said valve member will be moved quickly upon the force of said thermostatic means overcoming the magnetic force between said magnet and armature members, and means to abstract from said thermostatic means a portion of the heat supplied by said heating means and rendered effective upon movement of said thermostatic means.

15. An electric heat motor comprising a bimetal operating element, electric heating means for said element, and a sheet metal heat conducting member positioned for direct surface engagement with and intermediate the ends of said element intermediate the range of movement of said element thereby to abstract heat from said element prior to stoppage of movement of said element.

16. An automatically operable valve, comprising a valve casing, a valve member in said casing, a bimetal operating element for actuating said valve, electric heating means for said element, and a movable heat conducting member spaced from and positioned in the path of travel of said element, said conducting member being engaged and moved by said element and acting on engagement to carry away heat from said element so that delay in return movement of said valve member upon deenergization of said heating means will be decreased.

17. An electric heat motor comprising a bimetal operating element, a device normally engaged with and movable by said element, electric heating means for said element, and a movable heat conducting member spaced and separate from said device throughout the range of travel of said element and spaced from and positioned in the path of travel of said element for movement with said element, said conducting member being positioned for direct engagement with the surface of said element and being engaged by said element intermediate the range of travel of said element and acting upon such engagement solely to carry away heat from said element.

18. A compensated electric heat motor comprising a supporting bar of heat insulating material and having parallel faces, a plate of bimetal seated at one edge portion on one of said faces, a second plate of bimetal of less length than said first-named plate and seated at one edge portion on the other of said faces and extending in parallel overlying spaced relation to said first-named plate, an electric heating means carried by said first-named plate, and means securing said plates to said bar and operable to transmit heat from said first-named plate to said second-named plate thereby to compensate for the shorter length of said second-named plate.

19. An automatically operable valve comprising a casing having a valve port, a valve member having a flow controlling end portion cooperable with said port and having a stem, a hollow cylindrical magnet alined with and spaced from said port and having said stem loosely extending therethrough, a collar of magnetic material spaced from said end portion and surrounding and rigidly secured on said stem and spaced from said magnet in the closed position of said valve member, and a resilient thermostatic blade having an end portion engaging said collar thereby to actuate said valve member.

20. An automatically operable valve, comprising a valve body, a bonnet closing an open side of said body and having an aperture therethrough alined with the valve port, a valve member controlling flow through said port and having a stem extending through said aperture, a hollow cylindrical permanent magnet supported on said bonnet and surrounding said stem, a collar of magnetic material surrounding and secured on said stem and cooperating with said magnet to yieldingly urge said valve member to closed position, said collar being spaced from said magnet when said valve member is in closed position, and electrically heated thermostatic means engageable with said collar and operable when sufficiently heated to overcome the force of said magnet tending to hold said valve member closed thereby to open said valve member.

21. An automatically operable valve, comprising a valve member having a stem, an armature member secured on said stem and having an annular flange, a magnet surrounding said stem and cooperable with said flange to magnetically hold said valve member in closed position, actuating means cooperable with said stem to overcome the force of said magnet thereby to open said valve member, and means extending into the path of movement of said flange and operable to resist movement of said valve member by said actuating means, said extending means being spaced from said flange when said valve member is in closed position.

22. An automatically operable valve, comprising a valve member having a stem, an abutment on said stem, thermostatic means operable to move said valve member from one limit of movement, a pivoted arm extending into the path of movement of said abutment and spaced from said abutment when said valve member is at said one limit, a movable spring acting on said arm and exerting a force to interrupt movement of said valve member by said thermostatic means, and means constructed and arranged to support said spring in a position to exert a decreasing component of force in opposition to movement of said valve member upon movement of said arm by said thermostatic means, said thermostatic means being operable to overcome the opposing component of force of said spring, thereby to continue the movement of said valve member.

23. An automatically operable valve, comprising a valve member having a stem, an abutment on said stem, automatic means operable to move said valve member toward open position, a pivoted arm extending into the path of movement of said abutment and spaced from said abutment in valve member closed position, said arm having a cam portion, an adjustable stop member movable along said cam portion to determine the spacing of said arm from said abutment in valve member closed position, and means acting on said arm to interrupt opening movement of said valve member, said automatic means being operable to overcome said acting means and continue the opening movement of said valve member.

24. In an automatically operable valve, a valve member having a stem, actuating means cooperable with said stem to move said valve member toward open position, said stem having an abutment, a supporting bracket, means pivotally mounting said bracket, an arm pivoted on said bracket and extending into the path of movement of said abutment, means cooperable with said arm to oppose opening movement of said valve member, means to hold said supporting bracket in pivotally adjusted position, and means to hold said bracket against play at its pivotal mounting means.

25. An automatically operable valve, comprising a valve body having a valve port, a bonnet closing an open side of said body and having an aperture therethrough alined with said port, a valve member cooperable with said port and having a stem extending through said aperture, a supporting member mounted on said bonnet and having spaced pillars positioned parallel to and on opposite sides of said stem and joined by a cross member, said bonnet and said cross member having guide means for said stem, a housing enclosing said supporting member, a supporting bar horizontally supported for rocking movement within said housing and having parallel upper and lower faces, a bimetal blade secured to said lower face and extending toward said stem, an electric resistance heating coil for said blade, a bimetal blade secured to said upper face, means on said cross member supporting the free end of said second-named blade, a collar of magnetic material secured on said stem between said pillars and having spaced flanges receiving therebetween the free end of said first-named blade, a tubular permanent magnet surrounding said stem in cooperative relation to said magnetic collar, and heat conducting clamping means securing said first-named and said second-named blades to said supporting bar and transmitting heat from one to the other of said blades.

26. A fluid flow controlling valve, comprising a valve casing having a valve port and a bonnet with an aperture therethrough alined with said port, a valve member cooperable with said port, a stem extending from said valve member and projecting through said aperture, a tubular supporting member external of said casing and surrounding said stem and secured in said bonnet aperture, a magnet rigidly secured on said supporting member, an armature rigidly secured to said stem external of said casing and cooperable with said magnet to hold said valve member yieldingly in closed position, said stem in the closed position of said valve member holding said armature spaced from said magnet, and means to adjust said supporting member longitudinally of said stem to determine the spacing of said magnet from said armature in the closed position of said valve member thereby to regulate the holding force of said magnet.

27. An electric heat motor comprising a truncated triangular plate of bimetallic material, laterally positioned clips facing the longer base of said plate and punched-out of the area of said plate adjacent its shorter base, an electric resistance heating coil lying closely adjacent said plate, said plate material having an integrally formed operating end portion, a sheet of insulating material interposed between said coil and said plate, a sheet of insulating material supporting said coil, said insulating material sheets being of truncated triangular form, said clips overlying and forming an end abutment for said sheets at their shorter base and holding said sheets and coil to said plate, a mounting member, and means holding said sheets in position beneath said clips and holding said bimetal material to said mounting member.

EARNEST J. DILLMAN.